United States Patent [19]
Reilly

[11] Patent Number: 5,491,906
[45] Date of Patent: Feb. 20, 1996

[54] MASTER GAGE

[76] Inventor: Paul J. Reilly, 560 N. Moorpark Rd., Suite 150, Thousand Oaks, Calif. 91360

[21] Appl. No.: 295,428

[22] Filed: Aug. 25, 1994

[51] Int. Cl.⁶ .................................................. B27G 23/00
[52] U.S. Cl. ................................................ 33/640; 33/471
[58] Field of Search ........................ 33/640, 465, 471, 33/626, 630, 633, 634, 424, 538, 534, 832, 833; 83/522.15, 522.16, 522.17, 522.18, 522.19

[56] References Cited

U.S. PATENT DOCUMENTS

| | | | |
|---|---|---|---|
| 4,259,887 | 4/1981 | Dean | 33/833 |
| 4,779,354 | 10/1988 | Hill | 33/640 |
| 5,038,486 | 8/1991 | Ducate, Sr. | 33/471 |
| 5,121,553 | 6/1992 | Boerder | 33/640 |

OTHER PUBLICATIONS

Paragauge—by Accuset Tool Co. Inc. (Date Jul. 1989).

Primary Examiner—Christopher W. Fulton
Attorney, Agent, or Firm—Allen A. Dicke, Jr.

[57] ABSTRACT

The body of the gage is in the form of a channel with web and flanges. The web and flanges define three planar surfaces with the flange surfaces at a right angle to the web surface and parallel to each other. The edges define an orthogonal structure. An angle gage movably mounted on the body defines angles with respect to one of the orthogonal surfaces and a height gage on the body measures distances with respect to the same orthogonal surface.

32 Claims, 7 Drawing Sheets

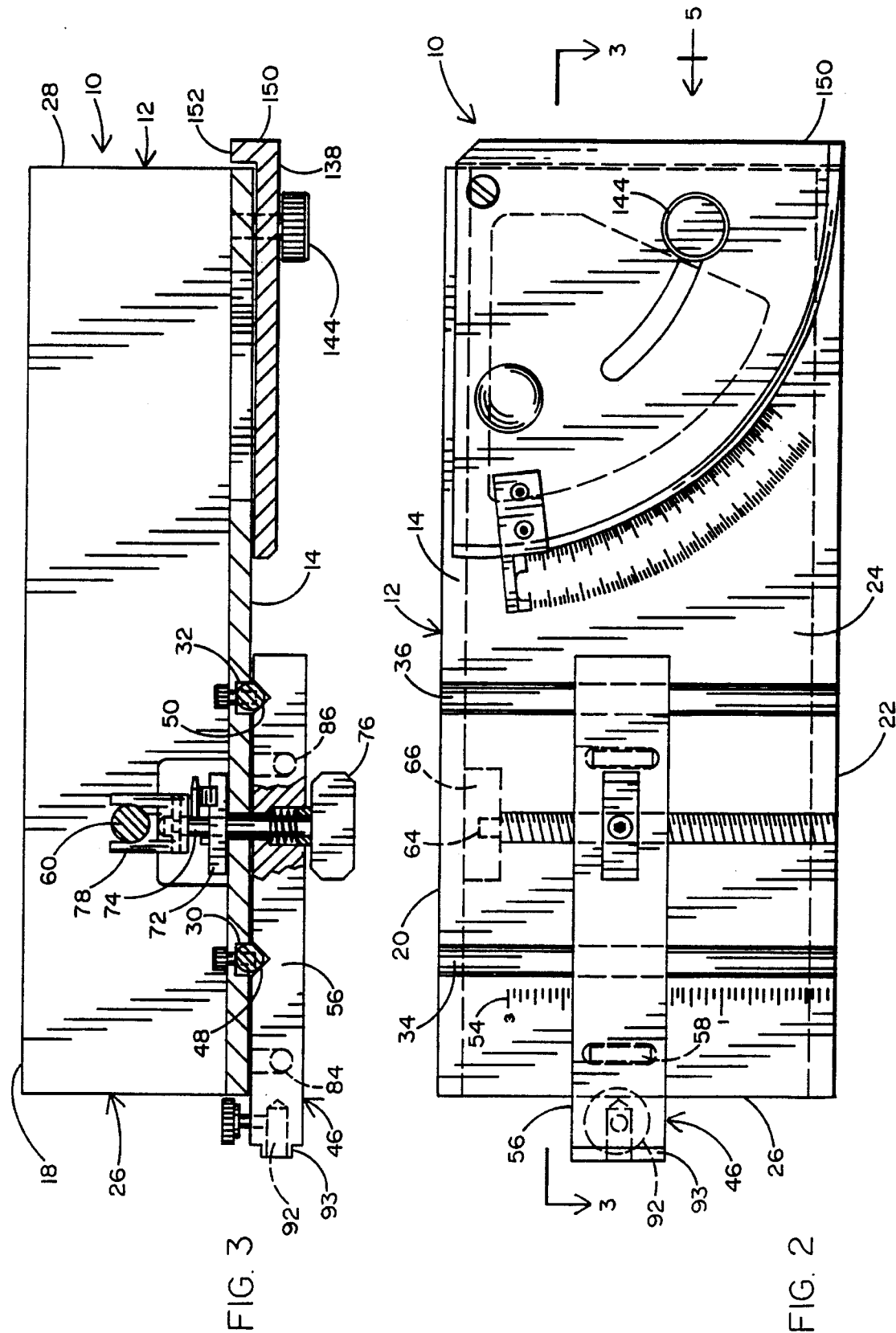

5,491,906

MASTER GAGE

FIELD OF THE INVENTION

This invention is directed to a gage which is suitable for setting woodworking and other machining equipment in preparation for cutting therewith. Both linear and angular gaging are provided.

BACKGROUND OF THE INVENTION

In woodworking, it is traditional to set the cutting tool with respect to the reference surface by utilization of a measuring scale. Then a test cut is made by moving a piece of wood along the reference surface and against the cutting blade. The test cut is measured, and adjustments are made. The lack of initial precision setting of the cutting blade results in delays in the wood shop, for the machine must be properly set before the correct cut can be made. Furthermore, test cuts consume both machine time and material so that additional costs and delays are incurred. It is desirable in woodworking to set the cutting blade accurately with respect to the reference surface so that accurate cuts can be made without the necessity for repeated adjustment of the equipment.

SUMMARY OF THE INVENTION

In order to aid in the understanding of this invention, it can be stated in essentially summary form that it is directed to a master gage which has a body with a plurality of surfaces thereon which are orthogonal with respect to each other. At least some of the surfaces are reference surfaces. A measuring arm is movable with respect to one of the surfaces so that it can be moved to a known distance from that surface where it can be locked in position. An angle arm is pivoted on the body and can be locked at a selected angle with respect to the same surface so that distance and angular measurements can be preset on the master gage for adjusting a machine with respect thereto.

It is, thus, a purpose and advantage of this invention to provide a master gage which can be preset to permit accurate adjustment of the cutting blade of a woodworking machine to the proper position for an accurate first cut.

It is another purpose and advantage of this invention to provide a master gage which can also be used for linear and angular alignment of, measurement of, layout of and marking of wooden components and assemblies in the wood shop.

It is another purpose and advantage of this invention to provide a master gage which has orthogonal surfaces which can be selected for use against reference surfaces on a woodworking machine and which has thereon movable gage arms which can be preset to permit presetting of the cutting tool of the woodworking machine.

It is a further purpose and advantage of this invention to provide a master gage which is easy to use and which is of economic construction so that it can be widely distributed to save time and material in the woodworking shop.

Other purposes and advantages of this invention will become apparent from a study of the following portion of the specification, the claims and the attached drawings.

BRIEF DESCRIPTION OF THE DRAWINGS

FIG. 2 is a front-elevational view thereof with the level arm in a substantially center position.

FIG. 3 is a section taken generally along line 3—3 of FIG. 2.

FIG. 10 is an isometric view of a guide bar for attachment to the body of the master gage for use of the master gage in connection with a guide slot in a saw table, or the like.

DESCRIPTION OF THE PREFERRED EMBODIMENT

Figure 1:
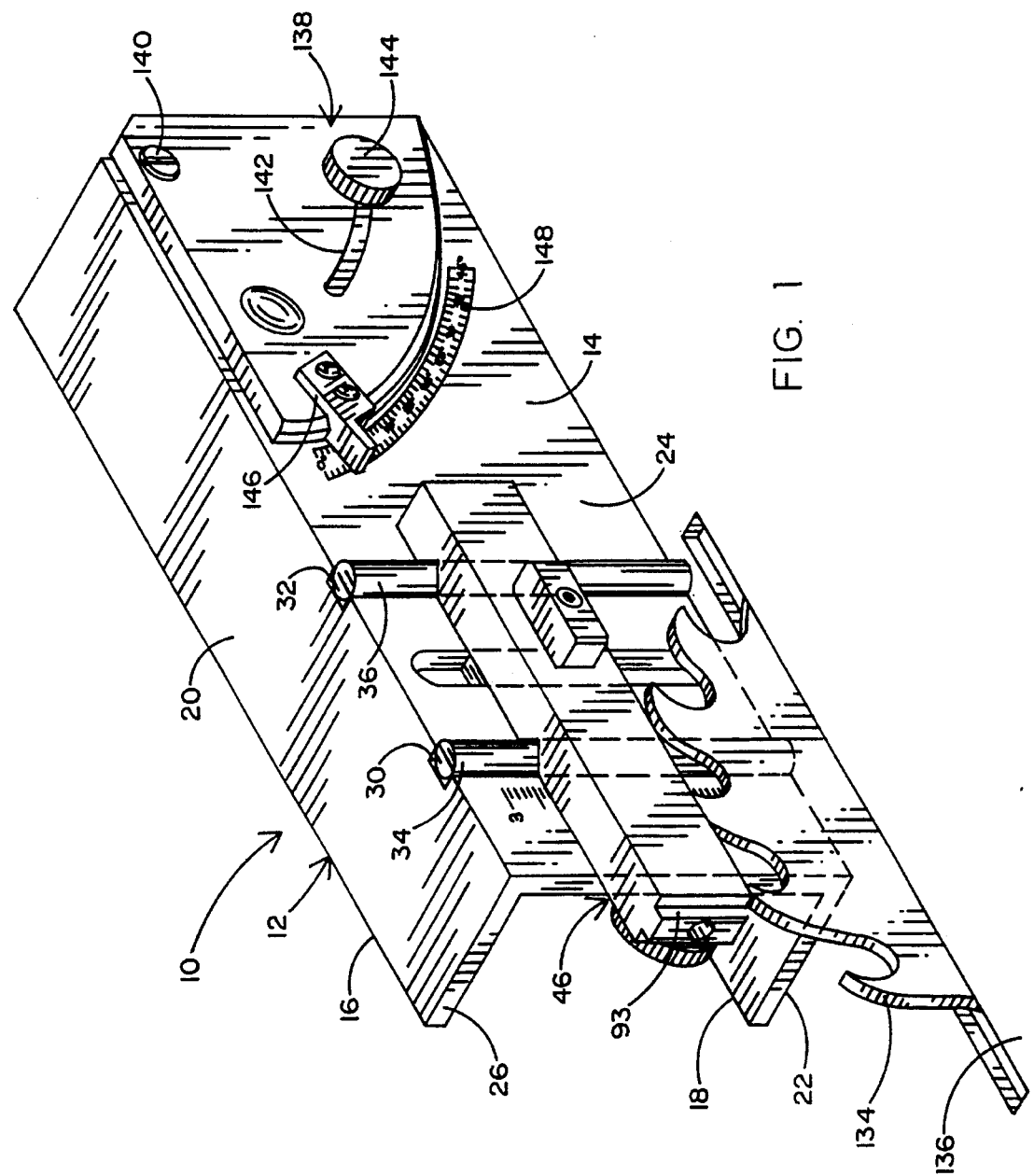
FIG. 1 is an isometric view of the master gage of this invention.

The master gage of this invention is indicated at 10 in its preferred embodiment shown in FIGS. 1, 2, 3, 4, 5, 6, 7, 8, 11 and 12. As seen in FIGS. 1, 2, 3, 4, 5 and 7, the gage 10 comprises a body 12 which has six external surfaces and, where the surfaces intersect the corner, they are at a right angle to each other. Opposite surfaces are parallel to each other. The body 12 could be a solid rectangular block, but in interest of conservation of weight, it is preferably in the form of a channel. The faces and edges of the channel define the six orthogonal surfaces. The channel is defined by web 14, which carries flanges 16 and 18. The principal surfaces are the external flange surfaces 20 and 22 (see FIGS. 1 and 2) and the web surface 24 (see FIGS. 1 and 7). Flange surfaces 20 and 22 lie parallel to each other, and web surface 24 lies at a right angle with respect to both of the flange surfaces.

On the first end of the body 12 seen in FIGS. 1, 2, 3 and 8, the ends of the flanges and the end of the web define left-end surface 26. The left-end surface 26 is at a right angle to the surfaces 20, 22 and 24. Similarly, a right-end surface 28 is defined at the other ends of the flanges and web, as seen in FIG. 3. The right-end surface is also at a right angle to the external surfaces of the flanges and web. Thus, the left- and reference surfaces are also parallel to each other to define a rectangular solid. The body thus defined as a rectangular solid serves as the body for gaging.

Figure 4:
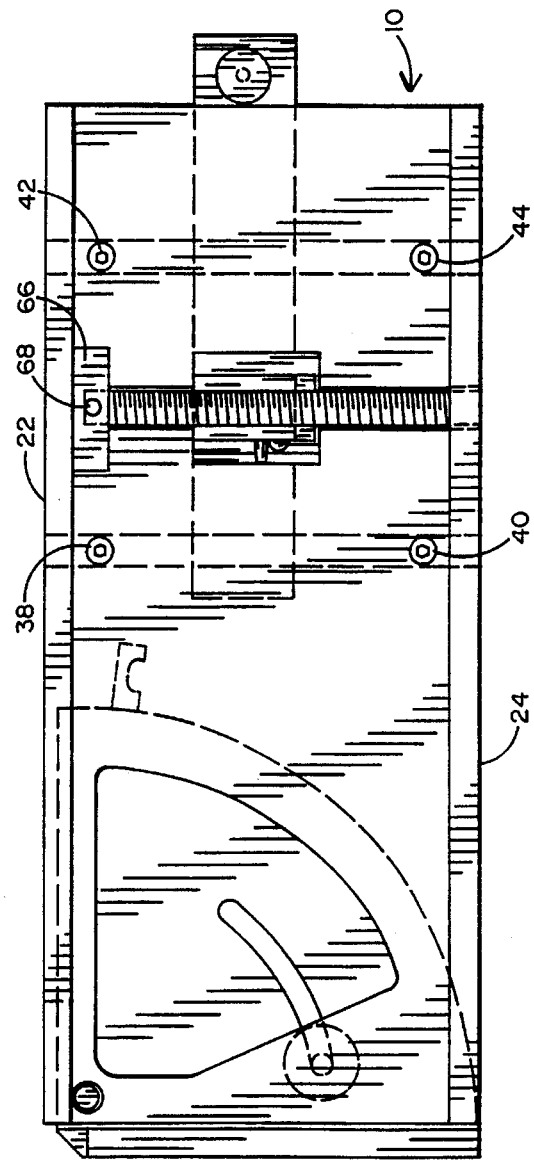
FIG. 4 is a rear elevational view.
Figure 5:
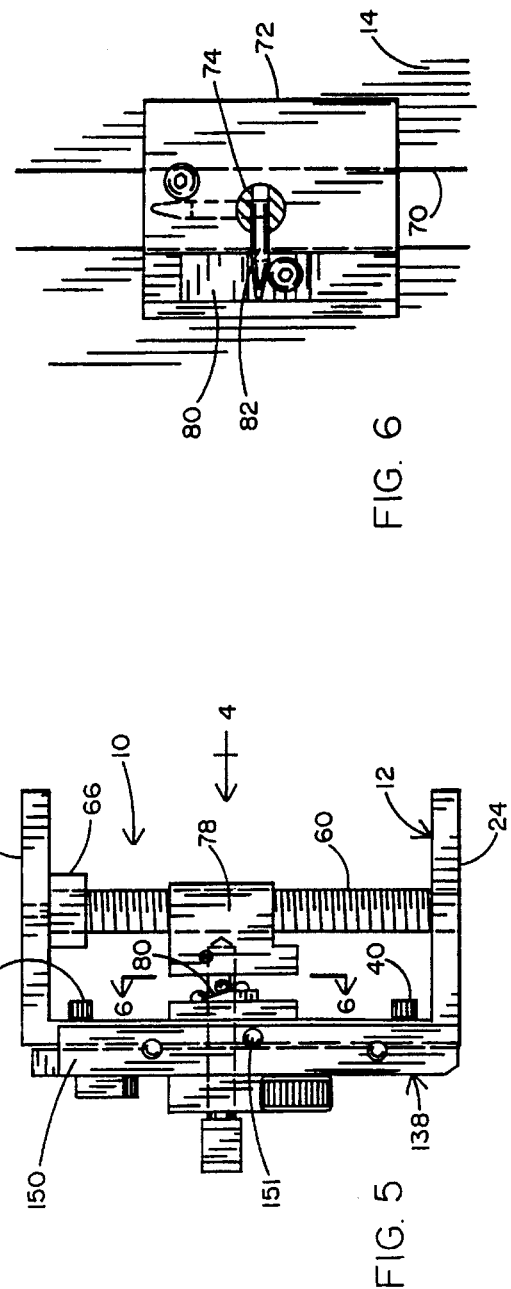
FIG. 5 is a right-end elevational view of the master gage as seen at 5 from the right end of FIG. 2.

As is seen in FIGS. 1 and 3, the surface 24 has slots 30 and 32 therein. These slots are parallel to the surface 24 and at a right angle to the flange surfaces 20 and 22. The width and depth of the slots 30 and 32 are such as to respectively receive the guide rods 34 and 36. The guide rods are cylindrical and are of hard material, such as steel. The guide rods are held in place by cap screws. The right end cap screws 38 and 40 are seen in FIGS. 4 and 5, while the left end cap screws 42 and 44 are only seen in FIG. 4. These cap screws securely hold the guide rods in place in parallel orientation and in an orientation in which their axes are parallel to the surface 24 and at a right angle to the surfaces 20 and 22.

Level arm 46 is a rectangular structure with all its six surfaces at a right angle to each other. Level arm has parallel V-shaped grooves 48 and 50 recessed into its rear surface. These V-shaped grooves are formed of walls which are at a right angle to each other and to the top and bottom surfaces of the level arm. These V-shaped grooves are spaced the same as the spacing between guide rods 34 and 36 and are sized so that the side walls of the V-grooves engage upon the guide rods when the level arm lies close to, but not quite in contact with the web surface 24, see FIG. 3. In this way, the level arm can slide up and down the guide rods and always remain parallel to the top and bottom surfaces 20 and 22. The level arm thus serves as a measuring device to establish distances between the fine surfaces and the level arm for later reference. Top and bottom surfaces of level arm 46 thus remains parallel to the lower external flange surface 22 so that measurements can be made there-between. Indicia 54 are marked on the face surface 24 in a direction parallel to the axis of the guide rods. The width of level arm 46 in the direction of motion is known so that the level arm 46 can be preset to known distances between the upper surface 56 or the lower surface 58 with respect to the lower external flange surface 22.

Lock post 60 is a threaded post. In accordance with this invention, the threads on lock post 60 are 32 to the inch. The purpose for this particular pitch will become apparent, but for other needs such as a metric master gage, threaded lock posts of other selected and known pitches may be employed instead. Lock post 60 extends through a hole in the bottom flange and has a screwdriver slot 62 therein, see FIG. 7. At its upper end, it has a turndown neck 64, see FIG. 2, which rotatably engages in block 66, see FIG. 4. The block is secured under top flange 16. When the lock post 60 is rotated into the desired position, it is locked in place by set screw 68, see FIG. 4. The proper setting of the lock post is discussed below.

Figure 6:
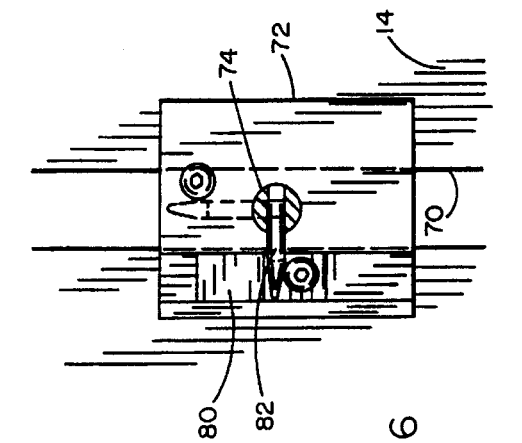
FIG. 6 is an enlarged detail of the cam structure, as seen along the line 6—6 of FIG. 5, with parts broken away.

Slot 70 is cut through the front of the gage parallel to the slots 48 and 50 and therebetween. Tee slide 72, see FIGS. 3 and 7, lies in the slot and engages against the back of web 14. Lock shaft 74 rotatably passes through the tee slide, and at its forward end, carries secured thereon knob 76, see FIG. 3. The rear end of the lock shaft carries half nut 78, which is rotatable on the lock shaft. The half nut has a rear, locked position wherein its threads engage on the threads of the lock post 60 and a forward, unlocked position where the threads of the half nut are away from the lock post. In FIG. 3, it is shown in the locked position. FIG. 6 shows the rear of the tee slide 72 and lock shaft 74. Next to the lock shaft, the tee slide carries cam 80, which is a sloping cam seen in side elevation in FIG. 5. Cam pin 82 is pinned through lock shaft 74 so that, when the lock shaft is rotated from the unlocked position (dashed lines in FIG. 6) to the locked position (fold lines in FIG. 6), the lock shaft 74 is forced rearwardly, away from the front face at web surface 14. This rearward motion causes the half nut 78 to engage on the lock post to lock the level arm in the selected position. Since the threads on the lock post are 1/32 inch apart, the level arm locks at discrete 1/32 inch. Initial adjustment of this positioning is achieved as follows: Using a standard known gage block of 0.500 inch for instance, bring the bottom 58 of the level arm 46 as close as possible to the top of the gage block. Then rotate the lock shaft 74 to engage the half nut 78 in the threaded shaft 60. Rotate the threaded shaft 60 via the screw driver slot 62 on the bottom of the shaft until the level arm lies on the gage block so that 0.500 is attained. Once done, tighten set screw 68 to secure the threaded shaft 60. The level arm is now calibrated.

Figure 14:
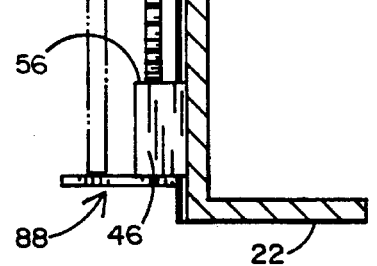
FIG. 14 is a right-hand elevational view of the master gage on reduced scale showing the manner in which a the level arm can be employed in establishing the height of a radial arm saw blade.

The level arm 46 carries embedded magnets 84 and 86, see FIG. 3, so that a steel blade 88 can be detachably attached to extend the gaging surface, see FIG. 14. In the primary usage of the gage, as seen in FIG. 14, the level arm 46 is set above the bottom surface of the gage 22 the desired distance between the cutting periphery of a circular saw blade and the table top of a radial arm saw, for example. Thereupon, the gage is placed on the saw table and the saw blade 90 is brought down to the top surface of the level arm, as seen in FIG. 14. This is an adjustment of the height of the saw blade with the saw blade not running. In this way, the height of the saw blade above the table is precisely set. The level arm 46 is of substantial height, for example 3/4 inch. If it is desired that the setting of the saw blade be less than that height, then the steel blade 88 is placed under the level arm 46 and held by the magnets 84 and 86, as seen in FIG. 14. In this utilization of the gage 10, the lower edge of the level arm 46 is the desired height above the surface 22, and the saw blade 90 is brought down to the top surface of the steel blade 88, as also seen in FIG. 14. In this way, the height of the saw blade above the saw table can be precisely preset.

The same utilization of the gage can be achieved in a table saw where the blade height above the table surface is measured. In that kind of setup, the bottom of the level arm is set at the desired height above the surface 22 and the table saw blade is brought up to the bottom of the level arm for precise setting of saw blade height.

Figure 13:
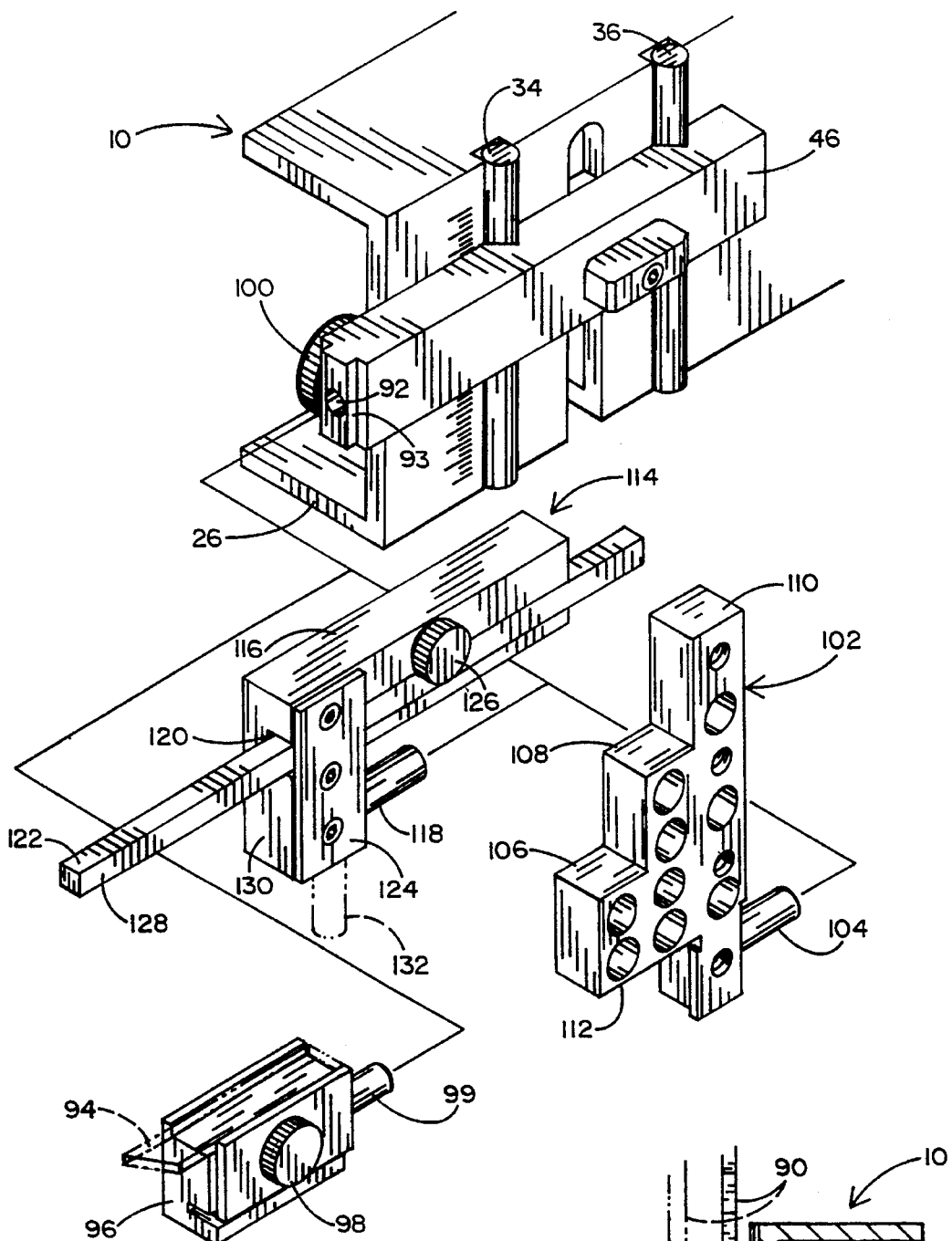
FIG. 13 is an isometric view of the level arm end of the master gage, with parts broken away, and showing various measuring fittings in association therewith.

As another enhancement of the gage 10, the end of the level arm 46 has a bored recess 92 therein for the detachable attachment of various auxiliary devices. The level arm 46 has an upright notch on each side of the recess 92. Notch 93 is seen in FIGS. 1, 2, 3 and 13. FIG. 13 shows a scribing knife 94 on body 96. The body 96 is provided with a knob 98 which tightens upon the scribing knife blade 94. The body 96 is mounted on a shank 98. The shank 98 is inserted into the recess 92 and the body indexed by a shoulder on the back of body 96 engaging the notch 93 in the level arm. It is secured therein by tightening knurled knob 100, which tightens a threaded clamp post against shank 98 to secure to the scribing knife 94 so that the scribing knife can scribe selected dimensions. The scribing knife and its shank are sized so that, when installed on the level arm, the knife edge would be level with the top of the level arm.

The level arm 46 can be used to support a number of different devices which enhance the use of the level arm as a height gage. Referring to FIG. 13, step block 102 has a shank 104 which permits the step block to be mounted and indexed on the level arm 46, as seen in the top of FIG. 13. When the step block is installed on the end of the level arm, its various steps 106, 108 and 110 are at a known distance above the top surface of the level arm, and thus can be used to measure heights above the table a distance greater than the top of the level arm can reach. The understep 112 can also be used as a measuring surface should circumstances require it.

Depth gage 114 is seen in the middle of FIG. 13. It has a body 116 which carries shank 118. The shank can be inserted into the recess 92 and the body restrained with respect to the level arm. The body 116 is sized so that its principal under side lies on the top of level arm 46 when shank 118 is installed in recess 92. Body 116 has a rectangular slot 120 in which lies depth gage post 122. The post is retained in its slots by cover plate 124 and is locked in its longitudinal position by clamp screw 126. The depth gage may have indicia 128 thereon to indicate how far the post extends from the face 130 of the body. Depth gage 114 can be set up at a known height above thee table and extend a known distance from the face 130 or from the face 26 of the gage 10. In this way, horizontal depth can be measured. In addition to setting the depth gage 114 as a horizontal depth gage, alternate shank 132 can be inserted into the recess 92 to configure the depth gage 114 as a vertical depth gage. Thus, it can be set to measure or indicate vertical distances with respect to the body of the gage 10.

The gage 10 of this invention can be used for various types of gaging activity in the wood shop. In FIG. 1, the level arm 46 is set to the predetermined height at which it is desired that the table saw blade 134 extends above the table top 136. In a utilization of this type, the level arm is set above the surface 22 a known distance, the surface 22 is placed on the table top 136, and the saw blade 134 is brought up to the measured height. Since the level arm 46 is parallel to the table top, the measurement of the saw blade height is measured accurately and without regard as to the location of the centerline of the saw blade or the arbor. One does not need to be directly over the centerline to take the saw blade height measurement. The saw blade can be set to great accuracy in this manner, thus obviating a plurality of test cuts. The height of a saw blade with respect to a table can be set in a similar way for radial arm saws (see FIG. 14) and the drills in drill presses. Horizontal measurements may be made by the level arm when the master gage is laid flat, as shown in FIG. 7.

The gage 10 is provided with a protractor dial 138, as seen in FIGS. 1, 2, 3, 5, 7, 8 and 9. The protractor dial 138 is slightly more than a quadrant of a circular disc. Like the body 12, the protractor dial 138 is made of rigid material such as metal. The protractor dial 138 is pivoted on the body 12 on pivot pin 140. The protractor dial also has an arcuate slot 142, which is arcuate about pivot pin 140. Clamp screw 144 extends through the slot 142 and is threadedly engaged in the web of the body. When the clamp screw is turned, it clamps the protractor dial against the face of web 14 to hold it in place. The edge of reference block 146 serves as witness line with respect to the angular indicia 148 on the web surface 24. The reference block positioned with respect to the angular indicia indicates the angle of gaging surface 150 with respect to the various orthogonal surfaces of the body 12. For example, the angle between the bottom surface 22 and the gaging surface 150 can be adjusted from 0 to 45 degrees. By turning the entire gage 10 end-over-end, angular measurements from 45 to 90 degrees can be accomplished. The back of the protractor dial 138 moves against the surface 24, and the protractor dial carries the flange 152 (see FIG. 3), which enlarges the gaging surface.

Adjustment of the protractor dial 138 is accomplished by laying the gage 10 with its bottom flange surface 22 on a reference flat surface. A square is laid on the reference flat surface and brought against the gaging surface 150. The protractor dial is adjusted by set screw 151 (seen in FIG. 5) until the gaging surface 150 lies properly against the square. Set screw 151 is threaded through flange 152 and engages against the end surface to act as an adjustable protractor zero stop. Thereupon, the protractor dial is locked by tightening clamp screw 144. At this point, the witness block 146 is adjusted on the protractor dial so that its reference face is at zero on the indicia 148.

Figure 7:
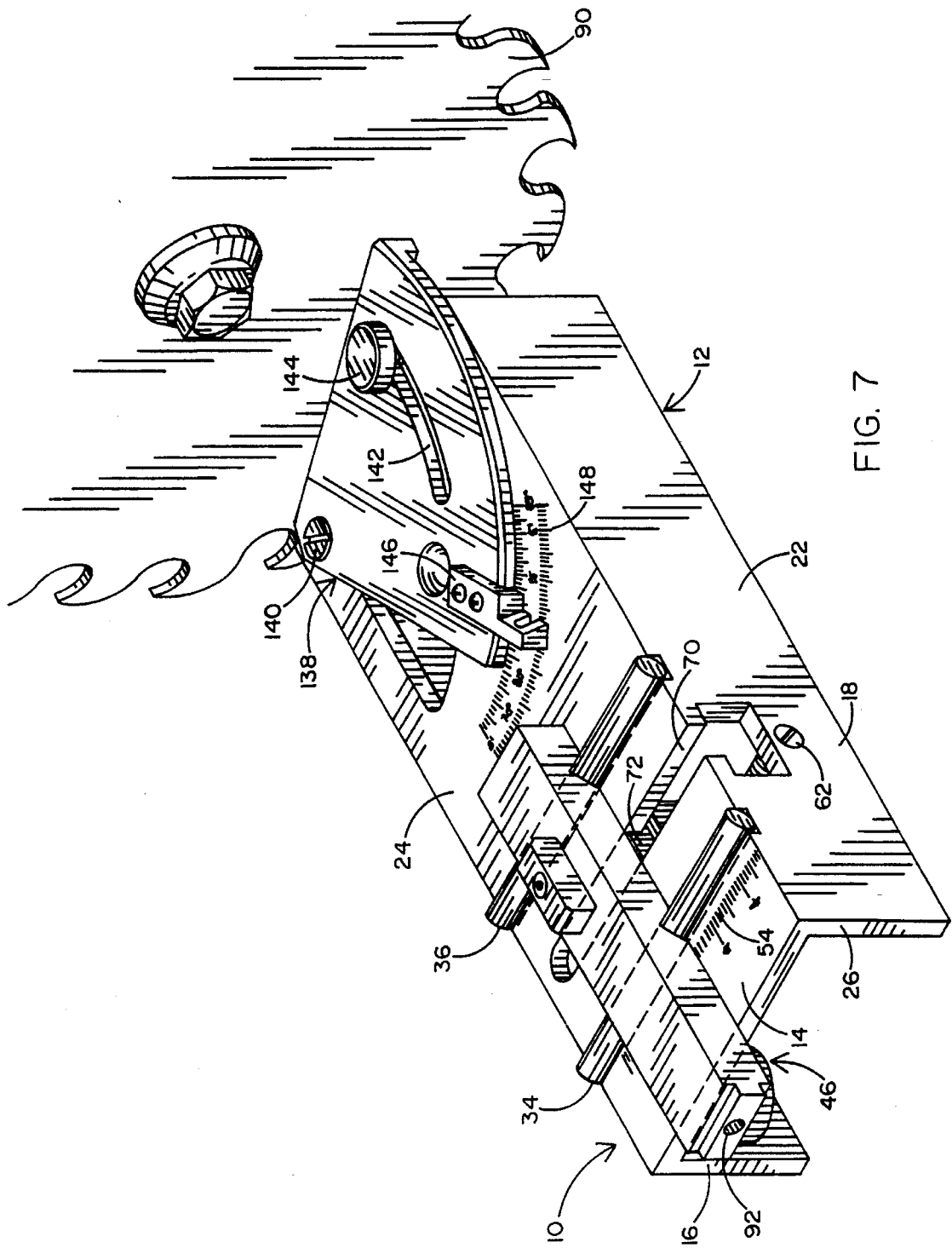
FIG. 7 is an isometric view showing the master gage of this invention with its protractor in a horizontal plane employed in setting an angle.

FIG. 7 illustrates the utilization of the protractor dial 138 with respect to a radial arm saw blade 90. In this case, the flanges rest on the saw table and the back flange 16 lies against the fence. The protractor dial 138 is set to the desired angle, and the radial arm saw blade is moved to that angle. Since the gaging surface 150 is beyond the end of the body 12, the gaging surface 150 can engage against the side of the blade 90 so that the set of the teeth does not interfere with the accuracy of setting the angle of the saw blade. The angular setting of a chop saw is set in a similar way to the angular setting of the radial arm saw.

On a table saw, the protractor dial can also be employed to set the angle of the tilt of the saw blade. The master gage protractor will be oriented as shown in FIG. 1. The protractor dial can also be used to set the tilt angle of the table in a band saw or the tilt of a fence on a jointer.

Figure 8:
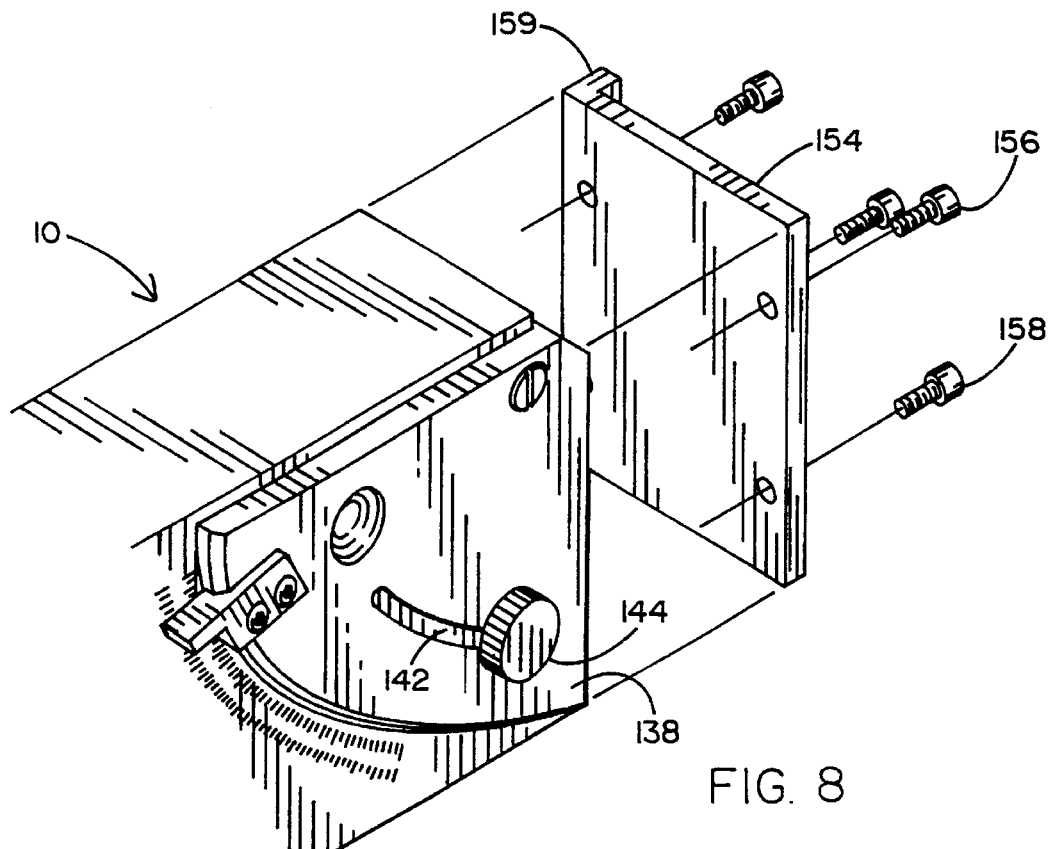
FIG. 8 is an isometric view of the right end of the master gage of this invention, with parts broken away, showing the attachment of an end plate shown in the exploded position for attachment to the protractor dial.
Figure 9:
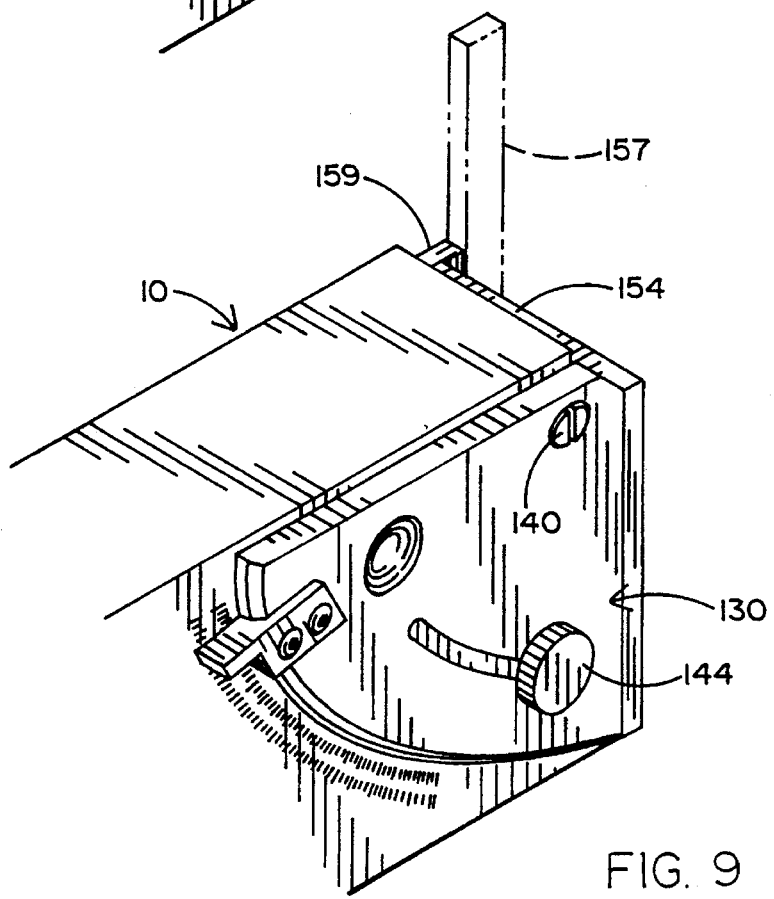
FIG. 9 is a similar view, showing the end plate attached.

The protractor dial may be enhanced by attaching protractor plate 154 thereon, see FIGS. 8 and 9. The protractor plate 154 has parallel faces and is attached to the flange 152 so that both of the faces of the protractor blade can be positioned at a known angle with respect to the rectangular surfaces of the body of the gage 10. The protractor plate is detachably attached by means of machine screws 156 and 158, which engage in the flange. The screw holes into which they attach are seen in FIG. 5. The extension bar 157, shown in dot-dash lines in FIG. 9, is detachably attached to the flange 159 on the protractor plate 154 by means of the two other machine screws shown in the right of FIG. 8. The flange 159 places the extension bar 157 sufficiently far from the pivot 140 so that the bar can swing over the top surface 20. The extension bar further enhances the number of surfaces which can be set at a preselected angle with respect to the gage body. Any artisan will find many utilizations for the master gage 10, including many functions where both the height of the level arm 46 and the angle of the protractor dial 138 are employed.

A table saw, such as that shown in FIG. 1, is a table 136 with a slot therein through which the saw blade 134 extends upward. It is the portion of the blade which is exposed above the table top which is effective in cutting. Saw tables such as saw table 136 usually have guide slots formed therein below the table surface and in a direction at a right angle to the saw spindle, and thus parallel to the side of the blade. In order to further enhance the utility of gage 10, guide bar 160 is provided, see FIGS. 10, 11 and 12. Guide bar 160 is a rectangular structure sized to slide in the table top guide slot. In order to minimize free motion in a lateral direction of the guide slot, the guide bar 160 is slotted at 162 and 164. Screws extend across the guide bar at these slots, and tightening of the screws spreads the guide bar at the slots. In this way, the guide bar can be adjusted at each end for a sliding fit within the guide slot with minimum side freedom. Guide bar 160 carries slots in its upper surface for the clamping therein of the gage 10. Flange slot 166 is sized to receive flange 18, see FIG. 12. Flange slot 168 is positioned to receive the other flange 16 together with clamp 170, see FIG. 12. Clamp 170 is sized to lie against flange 16 and against the right end of flange slot 168 so that, when clamp screw 172 is tightened, the clamp engages against flange 16. This positions the gage 10 so that it can be moved along the table top in a direction parallel to the table top slot for accomplishing various measurements with respect to the slot. This places the protractor dial in a horizontal plane so that it can measure the side of the saw blade with respect to the slot direction.

Figure 10:
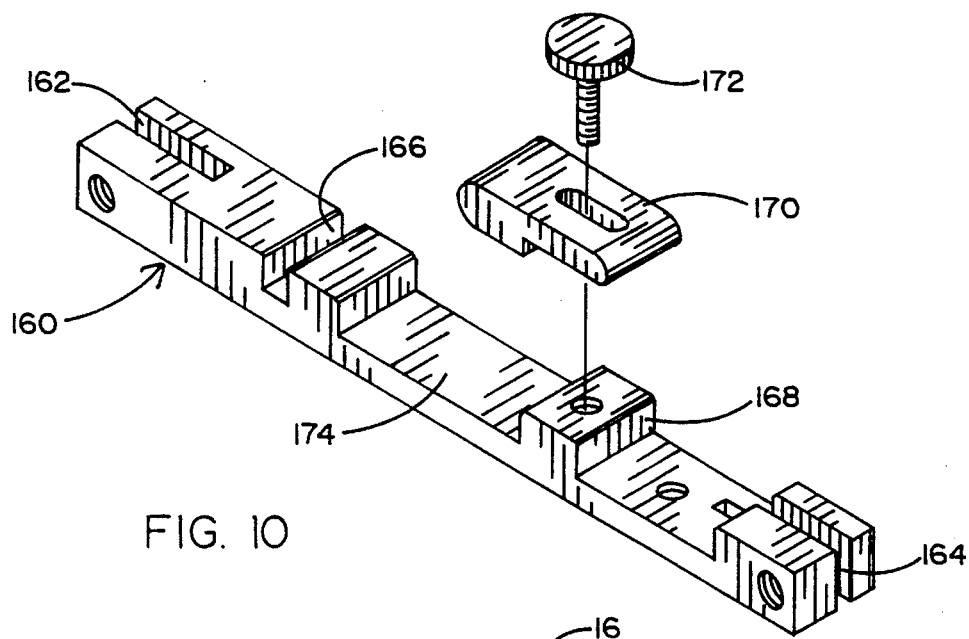
Figure 11:
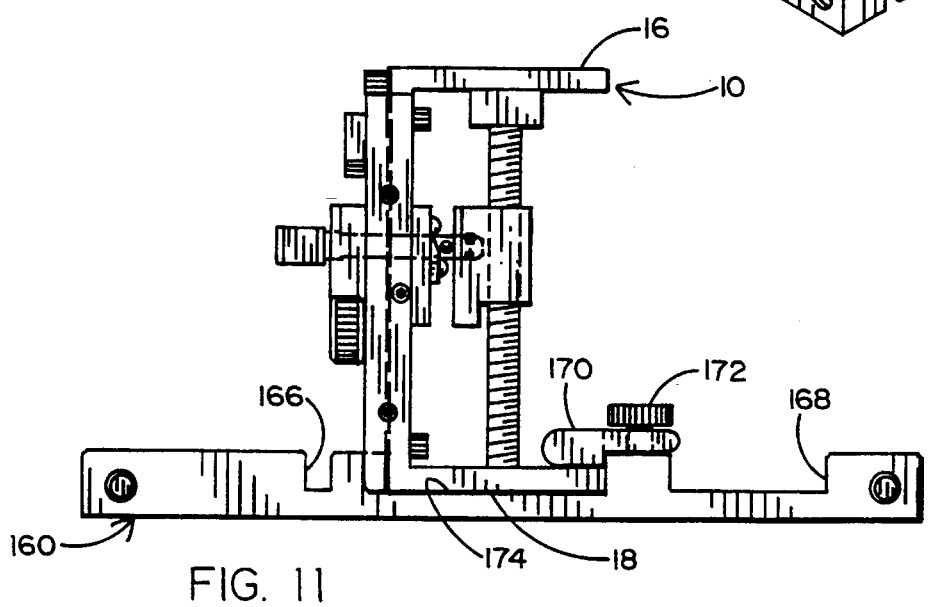
FIG. 11 is an end elevational view showing the body of the master gage clamped in the guide bar in a first position.
Figure 12:
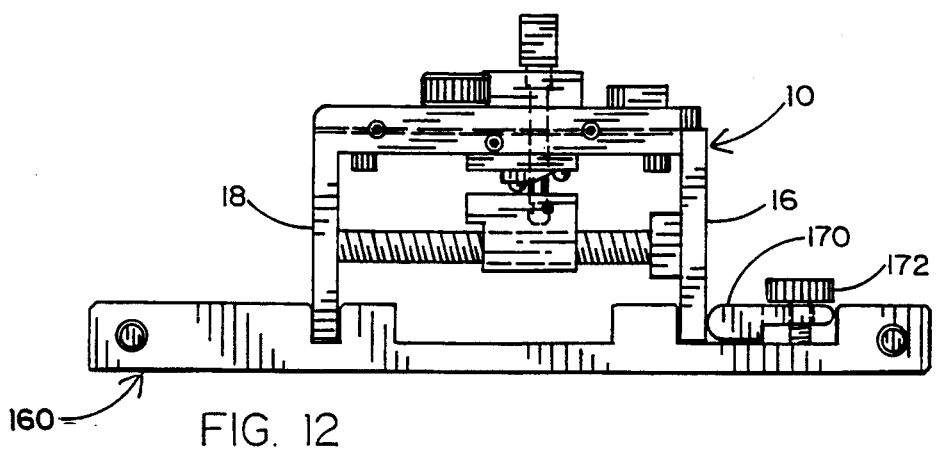
FIG. 12 is an end view of the master gage as it is clamped in the guide bar in a second position.

The guide bar 160 can alternatively receive the flange 18 in flange slot 174, see FIGS. 10 and 11. In this case, the clamp 170 clamps down upon the flange 18 to hold it in place. In this position, vertical angles can be measured as the gage is moved along the table slot.

This invention has been described in its presently contemplated best embodiment, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A master gage comprising:

a rectangular body, said body having thereon first, second and third substantially planar surfaces positioned mutually at right angles with respect to each other, said rectangular body having a fourth surface opposite said first surface and parallel thereto and having a fifth surface opposite said second surface and parallel thereto, first and second slots in said body on said first surface of said body, said first and second slots lying at a right angle with respect to said second surface of said body, first and second guide rods respectively lying in said first and second slots in said body, said first and second guide rods lying parallel to said first surface and at a right angle to said second surface;

a first gage arm having a gaging surface thereon, first and second grooves on said first gage arm for slidably mounting said first gage arm on said first and second guide rods and for constraining said first gage arm to move parallel to said first surface when said first guide arm moves along said guide rods: and a second gage arm pivotally mounted on said first surface so that it is angularly positionable with respect to said third surface to gage angles between said second surface and said pivoted second gage arm.

2. The master gage of claim 1 wherein said first gage arm has attachment means thereon for the detachable attachment of selected auxiliary measuring devices.

3. The master gage of claim 1 wherein there are indicia on said first surface so that the position of said first gage arm with respect to said second surface can be determined.

4. The master gage of claim 3 wherein there is lock means for locking said first gage arm with respect to said body.

5. The master gage of claim 1 wherein there is lock means for locking said first gage arm with respect to said body.

6. The master gage of claim 5 wherein said lock means comprises spaced notches so that said first gage arm can be locked with respect to said second surface at discrete distances therefrom.

7. The master gage of claim 1 wherein said second gage arm is a protractor dial, said protractor dial being pivotally mounted on said first surface for angular motion with respect to said third surface; and a protractor plate detachably attached to said protractor dial, said protractor plate being sized to substantially cover said third surface and being positioned substantially parallel to said third surface when said protractor dial is in it zero position.

8. The master gage of claim 7 wherein there are indicia on said first surface positioned with respect to said protractor dial so that said protractor dial can be set at a predetermined angle with respect to said second and third surfaces.

9. The master gage of claim 7 wherein an extension bar is detachably attached to said protractor plate, said extension bar being sized to extend beyond said protractor plate.

10. The master gage of claim 2 wherein said detachable attachment means comprises a notch on the end of said first gage arm, said notch being formed of first and second notch surfaces, said first and second notch surfaces being respectively parallel to said first and third surfaces on said body so that an auxiliary measuring device attached thereto is positioned relative to said first and third surfaces on said body.

11. The master gage of claim 10 wherein an auxiliary measuring device to be attached to said attachment means on said first gage arm can be selected from a group including a step block having a plurality of steps positioned at known distances and a depth gage which can be positioned by positioning of said first gage arm.

12. The master gage of claim 11 further including a miter bar, said miter bar being sized to slide in the table slot of a table saw and means for detachably attaching said miter bar to said master gage so that said master gage can be used as a gage by reference of a table saw and the miter bar slot therein.

13. The master gage of claim 11 further including magnets embedded in said first gage arm so that a steel member can be detachably attached thereto for gaging with respect to said first gage arm.

14. The master gage of claim 1 further including a miter bar, said miter bar being sized to slide in the table slot of a table saw and means for detachably attaching said miter bar to said master gage so that said master gage can be used as a gage by reference of a table saw and the miter bar slot therein.

15. The master gage of claim 1 further including magnets embedded in said first gage arm so that a steel member can be detachably attached thereto for gaging with respect to said first gage arm.

16. A master gage comprising:

a body, said body having first, second and third substantially planar surfaces positioned mutually at right angles with respect to each other, said rectangular body having a fourth surface opposite said first surface and parallel thereto and having a fifth surface opposite said second surface and parallel thereto, first and second guide rods on said body, said first and second guide rods lying parallel to said first surface and at a right angle with respect to said second surface:

a first gage arm slidably mounted on said first and second guide rods for constraining said first gage arm to move parallel to said first surface when said first guide arm moves along said guide rods;

lock means for locking said first gage arm with respect to said body, said lock means comprising a lock post having screw threads thereon, said lock post being positioned parallel to said first face, said lock means further including a half nut mounted with respect to said first gage arm to permit said first gage arm to be locked at the specific increments defined by the pitch of the threads on said lock post; and a second gate arm pivotally mounted on said first surface so that it is angularly positionable with respect to said third surface to gage angles between said second surface and said pivoted gage arm.

17. The master gage of claim 16 wherein said half nut is movably mounted on said first gage arm and there is means to selectively disengage said half nut from said lock post.

18. The master gage of claim 17 wherein said second gage arm is a protractor dial, said protractor dial being pivotally mounted on said first surface for angular motion with respect to said third surface.

19. The master gage of claim 18 wherein there are indicia on said first surface positioned with respect to said protractor dial so that said protractor dial can be set at a predetermined angle with respect to said second and third surfaces.

20. The master gage of claim 16 further including detachable attachment means comprising a notch on the end of said first gage arm, said notch being formed of first and second notch surfaces, said first and second notch surfaces being respectively parallel to said first and third surfaces on said body so that an auxiliary measuring device attached thereto is positioned relative to said first and third surfaces on said body.

21. The master gage of claim 20 wherein an auxiliary measuring device to be attached to said attachment means on said first gage arm can be selected from a group including a step block having a plurality of steps positioned at known distances and a depth gage which can be positioned by positioning of said first gage arm.

22. The master gage of claim 21 further including a miter bar, said miter bar being sized to slide in the table slot of a table saw and means for detachably attaching said miter bar to said master gage so that said master gage can be used as a gage by reference of a table saw and the miter bar slot therein.

23. The master gage of claim 21 further including magnets embedded in said first gage arm so that a steel member can be detachably attached thereto for gaging with respect to said first gage arm.

24. The master gage of claim 16 further including a miter bar, said miter bar being sized to slide in the table slot of a table saw and means for detachably attaching said miter bar to said master gage so that said master gage can be used as a gage by reference of a table saw and the miter bar slot therein.

25. The master gage of claim 16 further including magnets embedded in said first gage arm so that a steel member can be detachably attached thereto for gaging with respect to said first gage arm.

26. A master gage comprising:
   a rectangular body, said body having first, second and third surfaces respectively defining first, second and third planes, said body having fourth and fifth surfaces respectively parallel to said first and second surfaces, said planes being mutually at right angles to each other;
   first and second gage arms mounted to move on said first surface to move substantially parallel to said first plane;
   said first gage arm having a first gaging surface for moving with respect to said second plane and said first gage arm being mounted so as to maintain its gaging surface substantially parallel to said second plane so that said first gaging surface can be set to a predetermined dimension between said first gaging surface and said second plane, said first gage arm having a free end which extends beyond said body, means on said free end of said first gage arm for the selective attachment of a measuring device where the measuring device is selected from the group including a step block having a plurality of steps spaced at a known distance, a depth gage having an adjustable depth gage post and a scribing knife holder;
   said second gage arm being mounted on a pivot which is mounted on said first surface so that said second gage arm rotates about said pivot in a direction parallel to said first plane, said second gage arm having a second gaging surface thereon so that said second gaging surface can be angularly set with respect to said third plane for angularly gaging with respect to said second and third planes.

27. The master gage of claim 26 wherein said body defines fourth, fifth and sixth planes respectively parallel to said first, second and third planes so that said body defines orthogonal planes.

28. The master gage of claim 26 wherein there are indicia on said first surface adjacent said first gaging surface on said first gage arm so that said first gage arm can be set at a predetermined distance from said second plane and there are indicia on said first surface adjacent said second gage arm so that said second gage arm can be angularly set with respect to said body so that its gaging surface is angularly preset with respect to said third plane.

29. The master gage of claim 28 further including means interengaged between at least one of said gage arms and said body for locking said gage arm at precise intervals.

30. The master gage of claim 29 wherein said locking means is engaged between said first gage arm and said body.

31. The master gage of claim 30 wherein said locking means comprises a plurality of substantially equally spaced notches fixed with respect to said body and there is a corresponding notch engaging means attached to said first gage arm for detachable engagement with said spaced notches.

32. The master gage of claim 26 wherein there is a protractor plate detachably attached to said second gage arm, said protractor plate being position adjacent said third surface and being parallel to said third surface when said second gage arm is angularly set in its zero position, said protractor plate being angularly positioned in accordance with the angular position of said second gage arm.

\* \* \* \* \*